July 14, 1936.   O. E. MILLER   2,047,282
APPARATUS FOR COPY LENTICULAR FILM
Filed Sept. 29, 1934
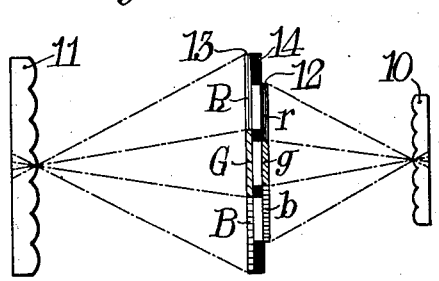
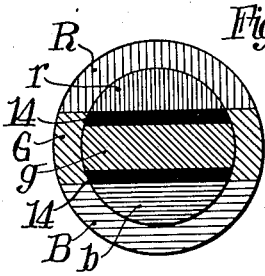
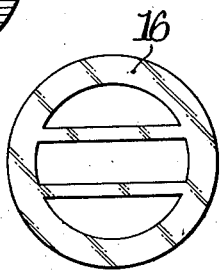
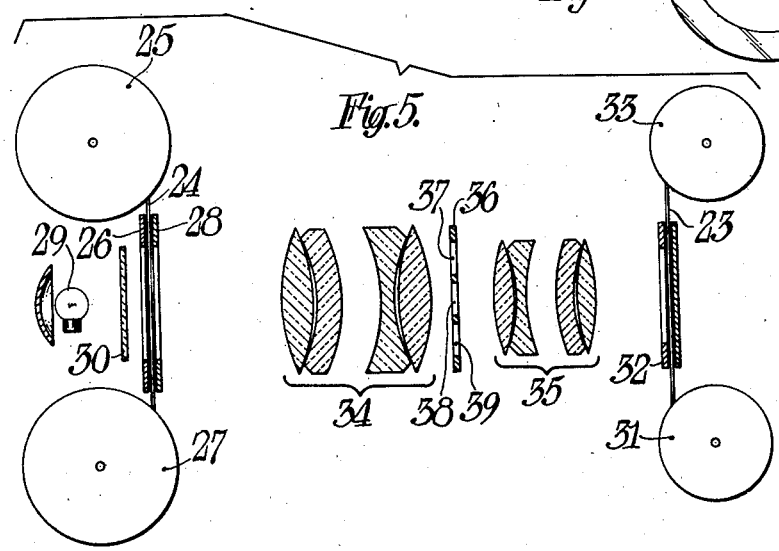
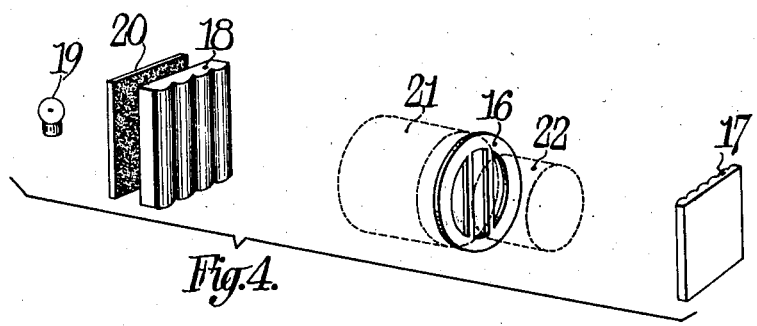
Inventor:
Oran E. Miller, Patented July 14, 1936

2,047,282

UNITED STATES PATENT OFFICE 2,047,282

APPARATUS FOR COPY LENTICULAR FILM

Oran E. Miller, Rochester, N. Y., assignor to Eastman Kodak Company, Rochester, N. Y., a corporation of New York Application September 29, 1934, Serial No. 746,250

2 Claims. (Cl. 88—24)

My present invention relates to an improved apparatus for duplicating lenticular film and more particularly to the printing of such film at a magnification other than unity.

In the reproduction of lenticular color films by projection printing it is possible to print either at an increase in magnification or at a reduction but heretofore such reproduction has always been subject to the limitation that the resulting relative aperture is increased or decreased inversely as the magnification. This change of relative aperture in the print gives rise to a number of disadvantages for if it is decreased considerable light is lost in projecting the copy film and the resolving power requirements are increased, while, if the relative aperture is increased, the relative aperture of the lenticulations or of the projection system will probably be exceeded.

These disadvantages are not present when the printing is carried out with the lenticulations on the copy film extending in a direction which is at a considerable angle to the direction of the lenticulations of the original film and this arrangement for making a copy of an altered scale is described and claimed by Merrill W. Seymour in an application filed August 1, 1930, Serial #472,349, which issued October 9, 1934 as Patent No. 1,976,300.

The primary object of the present invention is to provide an apparatus for printing goffered film on an altered scale and with the gofferings on the two films extending parallel to one another without materially affecting the relative aperture at which the print is recorded.

Another object of my invention is to provide a method and apparatus for printing lenticular film with a magnification other than unity whereby the lenticulations on both the original and copy films may have the same relative aperture and may extend in the same directions on the two films.

Other objects and advantages of the invention will be apparent from the following description when read in connection with the accompanying drawing and its scope will be pointed out in the appened claims.

In the drawing Fig. 1 is a diagrammatic view illustrating the evolution of the special diaphragm employed in the present invention. Fig. 2 is a plan view of the filters shown in Fig. 1. Fig. 3 is an elevation of a special diaphragm developed as shown in Figs. 1 and 2. Fig. 4 is a diagrammatic view in perspective showing an optical printer employing the diaphragm shown in Fig. 3. In Fig. 5 is a diagrammatic showing of an optical printer for motion picture film provided with transverse lenticulations.

Referring to Figs. 1 and 2, it will be observed that in making a reduction print on a film 10 from an original film 11 with the lenticulations of both films parallel to one another, if the print is to be recorded at the same relative aperture as the record on the original film 10, it will be necessary in projecting the film 10 to employ a banded filter 12 which subtends an angle at the film 10 which is equal to the angle which is subtended at the film 11 by a filter 13 which would be used in projecting the film 11. If the filter 12 is superposed on the filter 13, certain parts of the three filter areas r, g, b and R, G, B of the two diaphragms 12 and 13 respectively are common to both diaphragms. By using these common areas a diaphragm can be developed which will give the print the correct relative aperture if the overlapping areas of different color bands are made opaque so that light coming from one filter area in the original may not pass through the diaphragm opening corresponding to a different filter area in the print. In Figs. 1 and 2 the opaque material 14 shows the portions which must be made impervious to light. With these overlapping portions of different filter areas opaque as shown in Fig. 1, it will be observed that each of the three differently colored light beams usually red, green and blue directed onto the copy film 10 will have passed through its corresponding color component image on the original film 11.

If the copy film 10 is panchromatic, it would be possible to print it using the color filters arranged as shown in Figs. 1 and 2, however, as is well known, in practice the filters can be replaced by a diaphragm provided with apertures corresponding to the usual filter areas and such a diaphragm 16 is shown in Fig. 3.

From the above description it will be evident that the amount of reduction or magnification possible by this method is limited by the requirement that the blue and red filter portions in the film 13 must have at least some areas in common with the blue and red filter portions in the filter 12.

In Fig. 4 a complete optical system utilizing the special diaphragm 16 is shown for making a reduced print on a goffered film 17 from a goffered original film 18. The original film 18 is uniformly illuminated on its image side by means of a suitable source of light 19 and in interposed diffusing medium 20 which may be ground glass. An objective 21 indicated in outline having the desired relative aperture for projecting an aerial image in the form of bands of the photographic images on the original film at the filter plane of the objective 21 as is well known. A second objective 22 as shown in outline, projects this aerial image onto the copy film 17 and has the same relative aperture as the objective 21 but its focal length is less in order to secure the desired reduction in the size of the image formed on the film 17. The special diaphragm 16 is positioned in the common filter plane of the two objectives 21 and 22 and due to its special shape as described above, it transmits to the objective 22 only the light having the proper color values.

In using the arrangement just described the decreased size of the apertures in the diaphragm 16 theoretically reduces the amount of available light in projecting the copy film 17, actually considerable tolerance is available due to the limit of the resolving power of the photographic emulsion on the film 17 and the theoretical loss of light is not a practical disadvantage.

In making a print on a sensitive motion picture film 23 from an original motion picture film 24 in accordance with my invention, a projection printer on the type diagrammatically shown in Fig. 5 may be employed. In this printer the original film 24 or other picture record represented as having horizontal lenticular elements is moved a frame at a time by any well known pull-down mechanism (not shown) from a supply reel 25 through a gate structure 26 to a take-up reel 27. The gate 26 has a window 28 which is illuminated from a light source 29 through a plate 30 of ground glass or other diffusing medium. The film 23 to be printed which also has transverse lenticular elements is moved in synchronism with the film 24 from a supply reel 31, past a window 32 and to a take-up reel 33. The optical system of the printer comprises objectives 34 and 35 which have the same relative aperture but different focal lengths as described in connection with Fig. 4. These objectives are positioned on a common axis between the printing windows 28 and 32 so as to image the original film 24 on the copy film 23. There is positioned between the objectives 34 and 35 a diaphragm having apertures 37, 38 and 39 which correspond respectively to the different color components of the picture being printed as was described in connection with Figs. 1, 2 and 3. The shape and size of the apertures 37, 38 and 39 are determined as above described so that the diaphragm 36 will transmit light only through those parts of the objective 35 corresponding to the parts of the three filter areas of the two diaphragms which are common to both diaphragms, that is the diaphragm which would normally be used with the objective 34 for projecting the image of the film 24 and the diaphragm which would normally be used with the objective 35 for projecting the film 23.

From the above description it will be evident that all of the printing light passing through the aperture 37 in the diaphragm 36 will have passed through a single color component image on the original film 24 and will be directed to a single color component image area on the copy film 23. The same is true of the apertures 38 and 39 and the image received by the film 23 will be an exact duplicate on a reduced scale of the image carried by the original film 24 except that theoretically the color component images will be separated by dark lines which would tend to reduce the intensity of the subsequent projection but as has been pointed out above the actual light lost due to this cause is very small by reason of the resolving power of the photographic emulsion on the film 23.

Although the invention has been described as applied to a reduction printer, it is equally applicable to printing on an enlarged scale with no other alteration than changing the light source to illuminate the film 23 which in this case would be the original film and the copy film in the window 28 would receive the enlarged image.

It will be understood that any of the well-known expedients may be employed in connection with the printer of my invention for altering or improving the color saturation or for eliminating any moiré pattern which may appear on the copy film.

While I have described certain specific arrangements for illustrating my invention, it is to be understood that other apparatus may be employed for practicing my invention without departing from the spirit of my invention, the scope of which is pointed out in the appended claims.

What I desire to secure by Letters Patent in the United States is:

1. A projection printer for printing from an original film of a definite width and having linear lenticulations on its surface upon a separate film of a different width and having linear lenticulations positioned, when in the printer, in parallel relation to those on the original film, said printer comprising two windows for supporting the films in printing position, means for illuminating the original film in one window, an optical sytem for projecting an image of the original film on the film in the other window comprising two objectives of different focal lengths and of the same relative aperture and a diaphragm between the objectives, the diaphragm having a series of apertures corresponding to the registering portions of the color bands when the filters for projecting the two films are superposed.

2. A projection printer for printing pictures on a sensitive film having linear lenticulations from an original film having linear lenticulations parallel to those on the sensitive film comprising means for supporting the two films in spaced relation with their lenticulations parallel and facing each other, an optical system for imaging the picture on the sensitive film with a magnification other than unity, said optical system comprising two objectives of different focal lengths and of the same relative aperture and a diaphragm between the objectives and having a series of apertures corresponding to the registering portions of the color bands when the filters for projecting the two films are superposed.

ORAN E. MILLER.